Patented Oct. 10, 1933

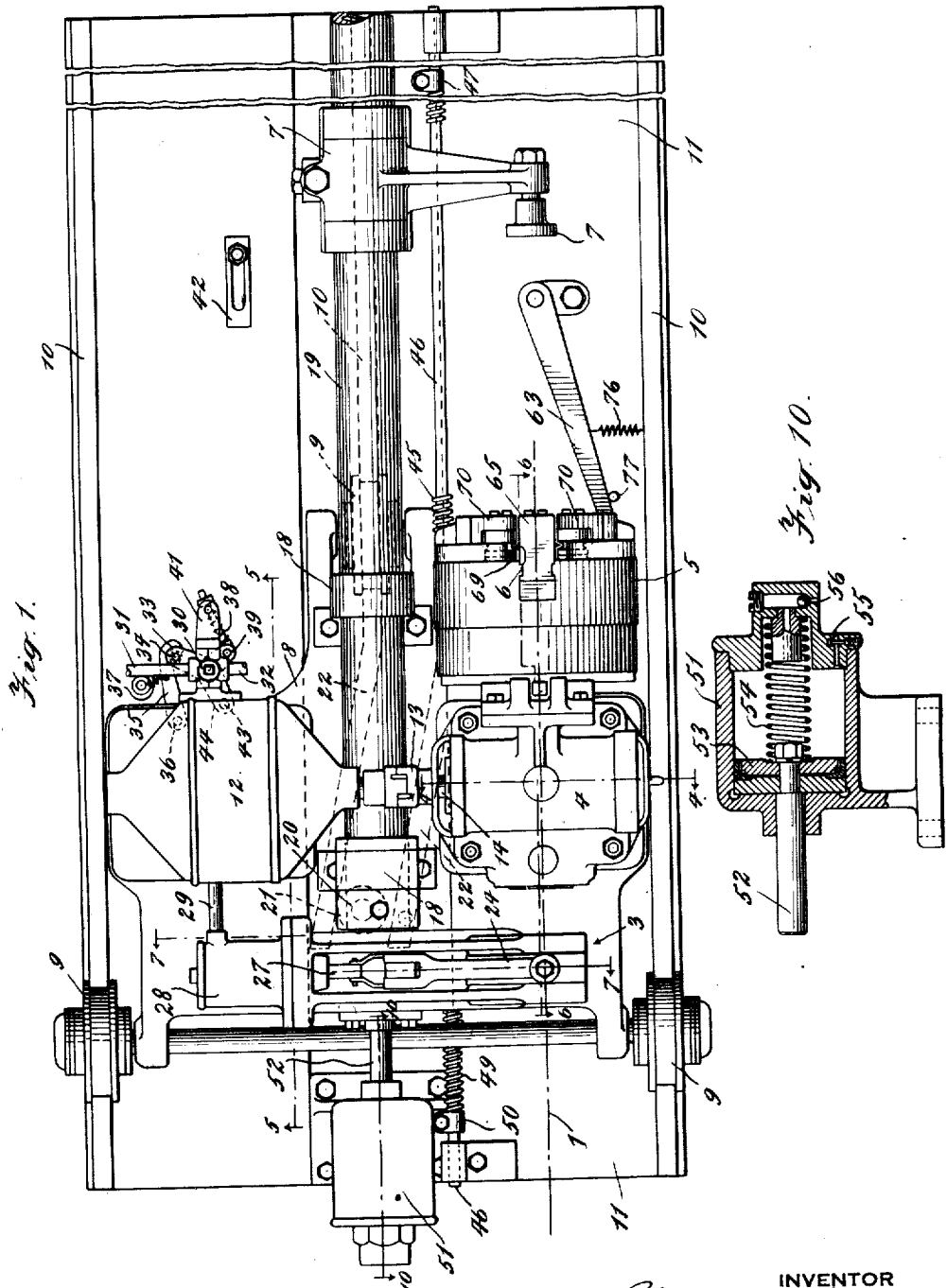

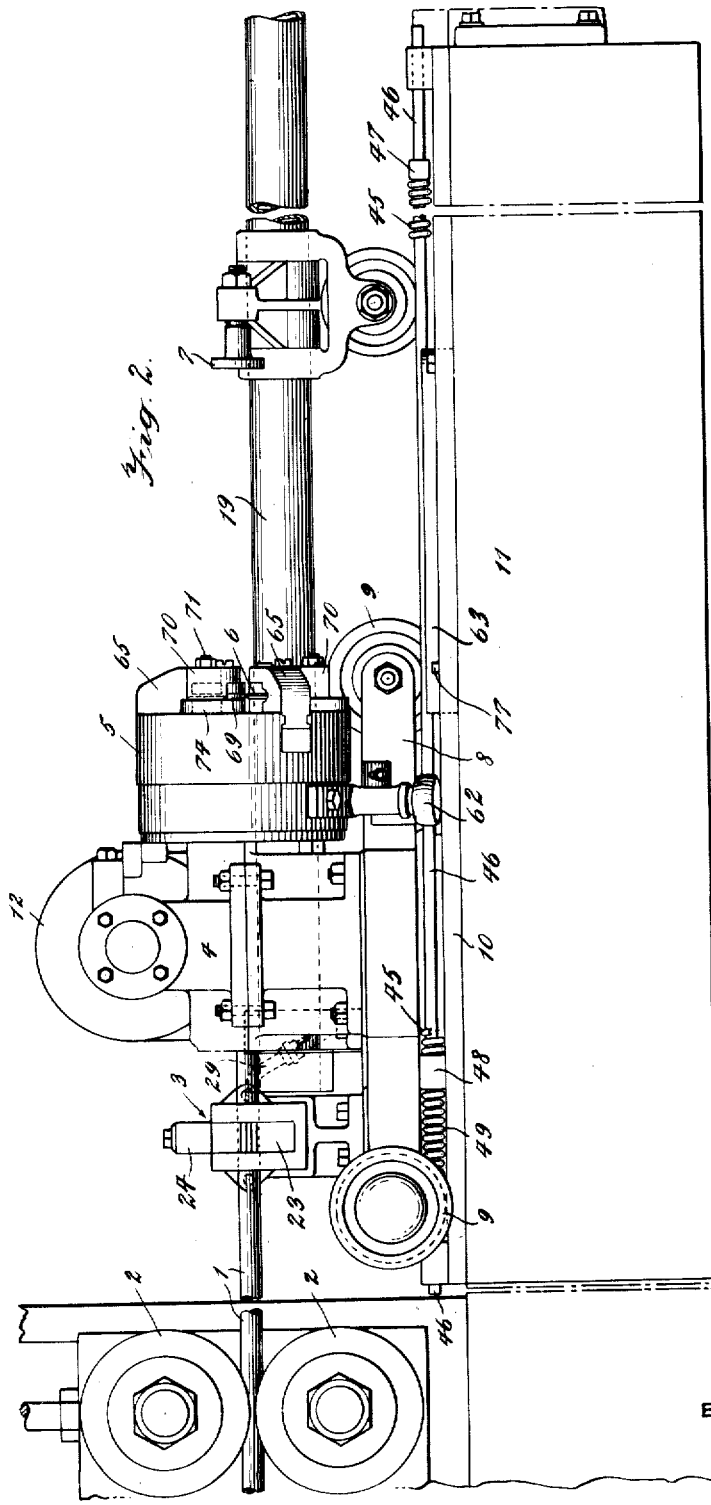

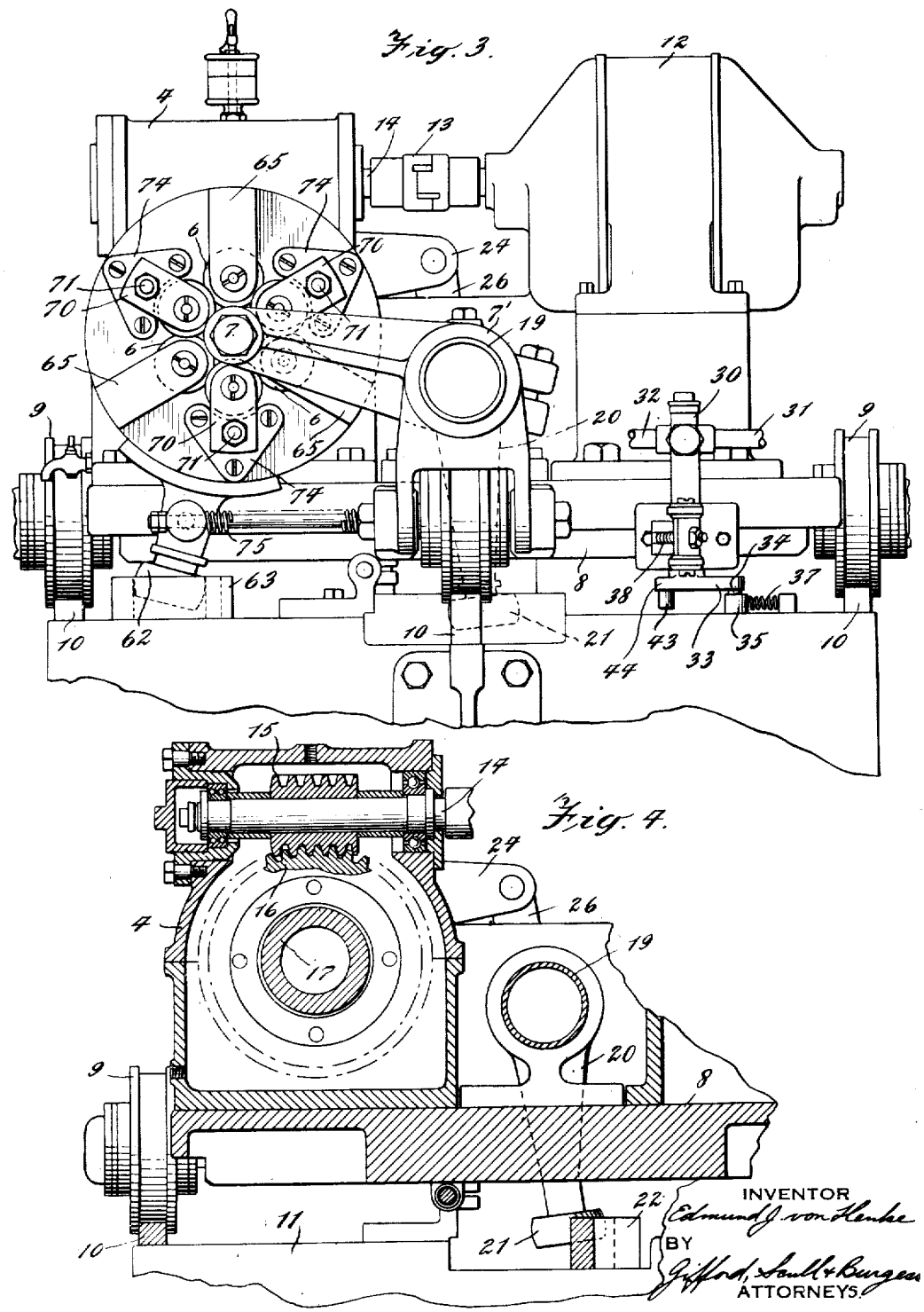

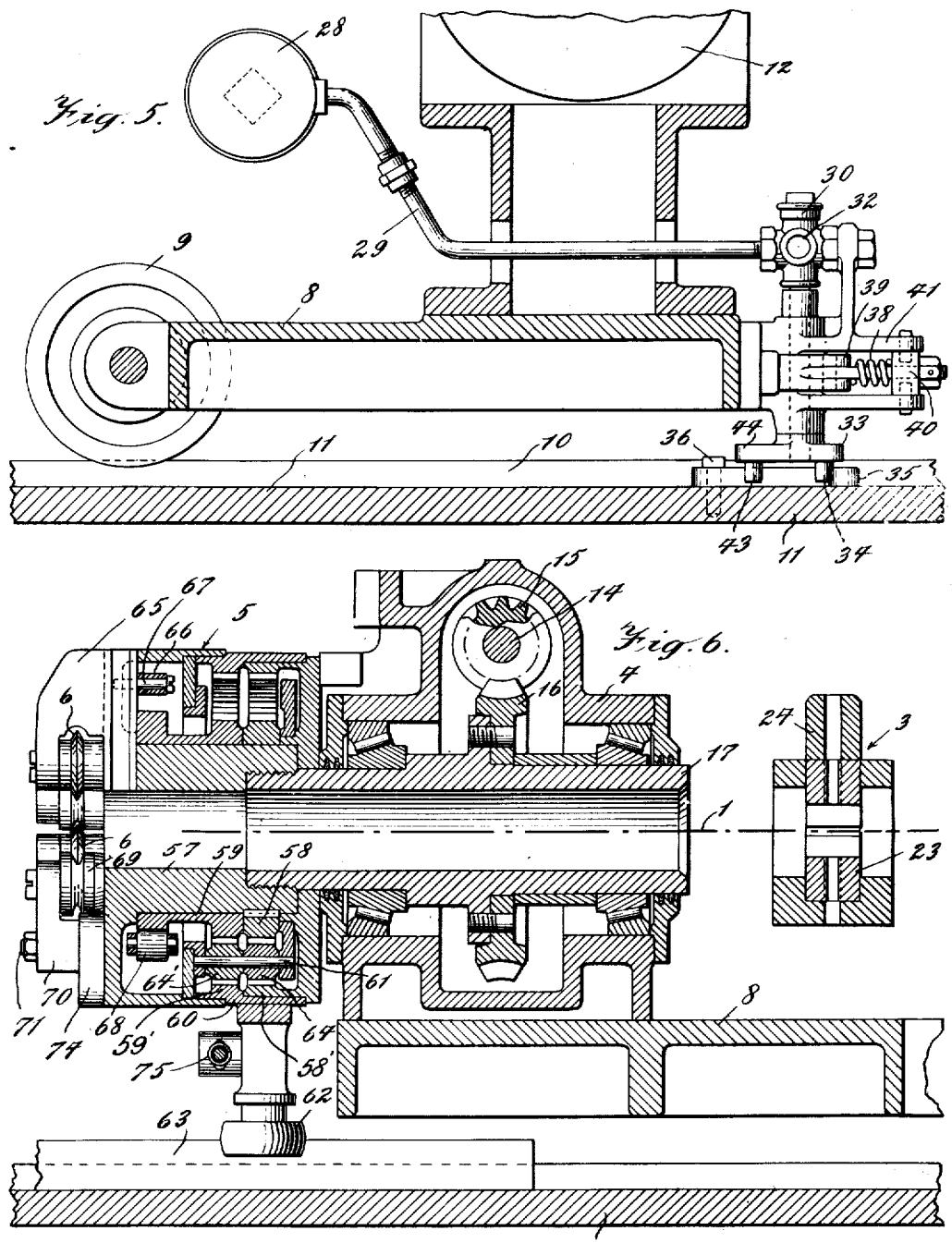

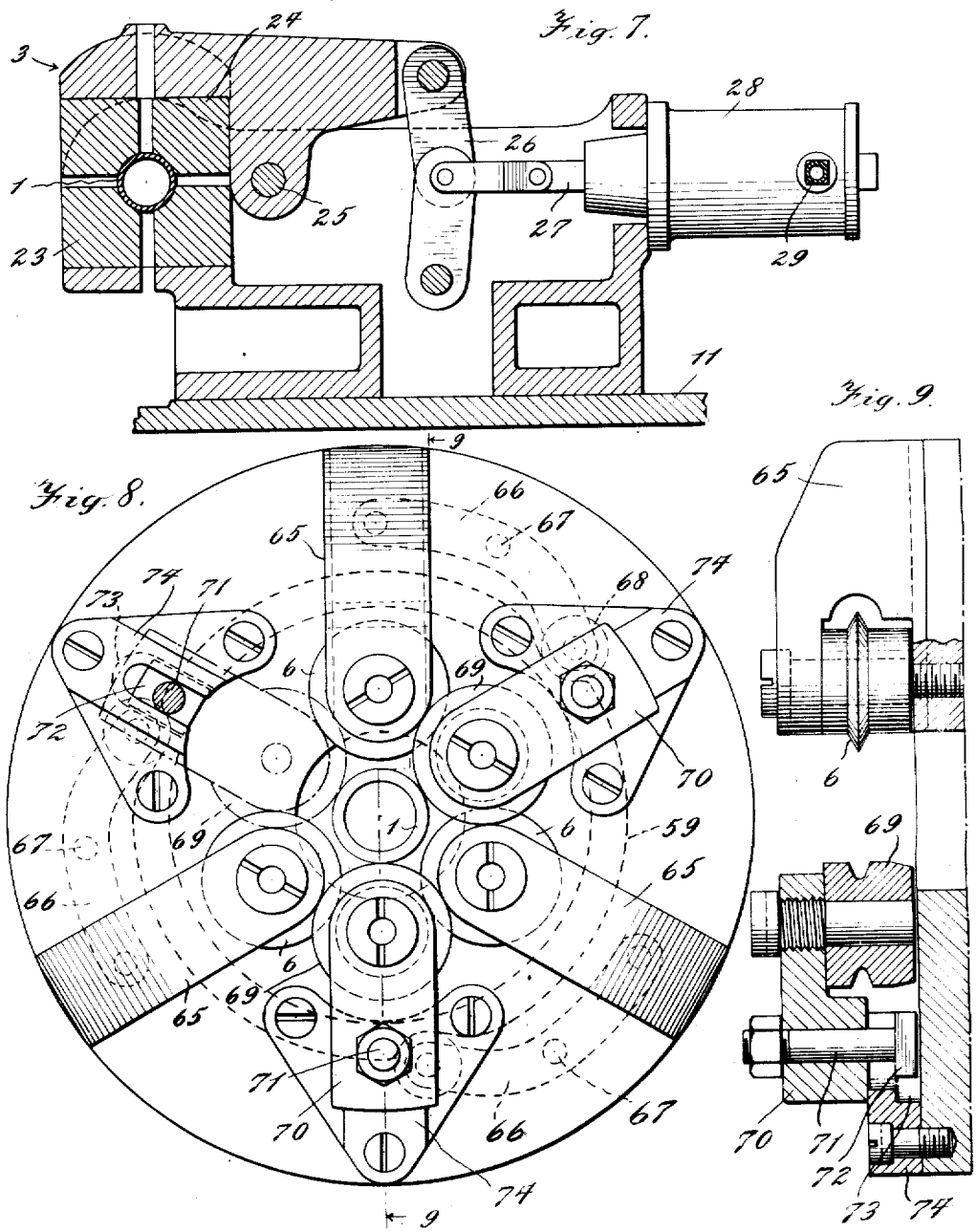

1,930,295

UNITED STATES PATENT OFFICE 1,930,295

TUBING CUTTER

Edmund J. von Henke, Chicago, Ill., assignor to American Electric Fusion Corporation, Chicago, Ill., a corporation of Illinois Application February 23, 1929. Serial No. 341,975

22 Claims. (Cl. 81—190)

This invention relates to a novel and improved form of tubing cutter, the novel features of which will be best understood from the following description and the annexed drawings. In these drawings, in which I have shown a selected embodiment of the invention;

Fig. 1 is a plan view of an apparatus embodying the invention.

Fig. 2 is a vertical front view of the apparatus appearing in Fig. 1, together with a fragmentary view of a tube mill associated therewith.

Fig. 3 is an elevation of the apparatus appearing in Fig. 1, as viewed from the right of that figure, parts being omitted for the sake of clearness.

Fig. 4 is a fragmentary section approximately on the line 4—4 of Fig. 1.

Fig. 5 is a fragmentary section on the line 5—5 of Fig. 1, parts being omitted for the sake of clearness.

Fig. 6 is a fragmentary section on the line 6—6 of Fig. 1.

Fig. 7 is a section on the line 7—7 of Fig. 1, parts being omitted for the sake of clearness.

Fig. 8 is a front face view of the structure shown in Fig. 6, as viewed from the left of that figure.

Fig. 9 is a section on the line 9—9 of Fig. 8.

Fig. 10 is a section on the line 10—10 of Fig. 1.

Referring particularly to Figs. 1 and 2, the invention is designed for use in connection with a tube mill and is adapted to sever tubing coming from the mill into tubes of desired length. At the left hand end of Fig. 2, I have shown tubing 1 emerging from a mill, the details of which form no part of this invention, which may comprise a pair of rolls 2 from which the tubing is discharged in a continuous length. This tubing then passes through a pair of clamping jaws, indicated generally at 3, through a transmission casing 4 into a guide 5, which guide contains means for operating a plurality of knives 6 for severing the tubing into lengths. The tubing is fed through the parts enumerated above, by the motion imparted thereto in the mill, and it proceeds until the end of the tubing comes in contact with a stop 7.

All the parts mentioned above, are mounted on a carriage 8 supported on rollers 9 running on rails 10 on a base 11. This carriage has mounted thereon in fixed position a motor 12, which through suitable connections 13 operates a shaft 14, (Figs. 4 and 6), upon which is a worm 15 meshing with a worm gear 16 secured to a sleeve 17 journaled in the transmission casing 4, which is also secured in position on the carriage.

Also supported on the carriage are suitable bearings 18 in which is journaled a rock shaft 19 to which is adjustably secured the stop 7 as by a collar 7' slidably mounted on the shaft and clamped thereto. Secured to the left end of the rock shaft is an arm 20, best shown in Figs. 3 and 4, and on the lower end of this arm is a cam follower 21 which follows a track comprising a pair of rails 22 secured to the base. By this arrangement movement of the carriage to the right, as viewed in Figs. 1 and 2, will cause rocking of the shaft 19 and consequent removal of the stop 7 from in front of the tubing.

According to this embodiment of my invention, the stop is employed to give initial motion to the carriage and the parts carried thereon. As just stated above, the stop is removed from its position in front of the tube end and this removal is designed to take place almost immediately upon starting of the carriage, so that undue strain will not be put upon the tubing. I provide means which will act, before removal of the stop, to clamp the tubing to the carriage at a point nearer the mill, and also means for severing a desired length of tubing and then releasing the carriage from the tubing and returning it to initial position. This means will now be described.

The clamping jaws 3, (Figs. 1, 2, 6 and 7), are shown as comprising a lower stationary jaw 23 mounted on the carriage 8 and adapted to receive the tubing 1. Pivotally mounted above the jaw 23 is a movable jaw 24 pivoted at 25 and adapted to be brought into engagement with the tubing as by means of a toggle 26 operated by a piston 27 actuated by fluid pressure in a cylinder 28. A fluid is admitted and exhausted from the cylinder through a suitable pipe 29, best shown in Fig. 5.

This fluid, such as air, is controlled by means of the valve 30, which is disposed in both the air supply line 31 and the exhaust line 32. The valve may be of any suitable construction, designed upon rotation to one position to admit air from the line 31 to the pipe 29, and when rotated to another position to exhaust air from the pipe 29 to the line 32. A further detailed description of this valve is considered unnecessary.

The valve 30 is arranged to be opened to admit air or other fluid to the pipe 29 immediately upon movement of the carriage from the position shown in Figs. 1 and 2 towards the right. This operation of the valve is achieved by means of a bell-crank lever secured to the valve and having one arm 33 provided with a pin 34 adapted to be engaged by a latch 35 pivoted at 36 on the base, the latch being urged towards the pin by a compression spring 37. By this means when the carriage starts its movement towards the right, as viewed in Figs. 1 and 2, the latch, which it will be noted is in the form of a hook, will restrain the pin 34 and thus cause rotation of the valve, this rotation causing air to be admitted to the cylinder 28, which in turn will cause operation of the toggle 26 and clamping of the tubing between the jaws 23 and 24. This action takes place against a compression spring 38 which engages the end of another arm 39 on the bellcrank lever and a bearing 40 pivoted in a bracket 41. This spring normally tends to hold the valve in neutral position, and after a certain amount of air is admitted to the cylinder 28 and the pin 34 has escaped from the latch, the valve will then be closed by the spring 38.

The tubing is now secured to the carriage by means of the clamping jaws 23 and 24, and continued moving of the tubing towards the right in Figs. 1 and 2 will cause this movement to be transmitted through the jaws to the carriage. The stop 7 will now be rocked out of engagement with the end of the tubing by engagement of the cam follower 21 with the track 22, as described above. During this movement of the carriage, the knives on the guide will be operated by means to be described later, and after the cutting operation is completed the carriage is released from the tubing, this release being caused by engagement of a stop 42, adjustably mounted on the base, with a pin 43 on another arm 44 of the bell-crank lever. This engagement causes the valve to be turned so as to exhaust the air from the cylinder 28 and release the carriage from the tubing. The carriage is then returned to the position shown in Figs. 1 and 2, as by means of a spring 45 surrounding a rod 46 and engaging at one end an adjustable stop 47 on the rod, and at the other end engaging an abutment 48 on the carriage. The return of the carriage is cushioned by means of one or more springs 49 disposed on a continuation of the rod 46 and engaging at one end an adjustable stop 50 and adapted to be engaged by the abutment 48 upon return of the carriage. I also provide a dash pot 51 as another shock absorber, this including a piston 52 having a head 53 acting against the spring 54 and also against air which may be trapped in the dash pot and which may be slowly exhausted and let in through any suitable valve arrangement exemplified by the valves 55 and 56.

The means for severing the tubing into desired lengths will now be described.

Referring particularly to Figs. 3, 6 and 8, the tubing passes between the jaws 23 and 24 and through the sleeve 17 and the guide 5 concentric therewith. This guide comprises a body 57 having a bore concentric with that of the sleeve 17, and through which the tubing passes. This body is fast to the sleeve 17 as plainly indicated in Fig. 6, so as to be rotated thereby about the axis of the tubing from the motor 4. Keyed to the body is a spur gear 58, and rotatably mounted on the body and concentric therewith is a cam 59 having gear teeth thereon. The teeth on the spur gear 58 and the cam 59 form two similar gear rings, one of which is fast to the chuck body and the other of which is movable thereon.

Supported in a movable cage 60 is one or more pairs of pinions, each pair rotatably journaled on a shaft 61 and one pinion meshing with the fixed gear ring 58 and the other with the movable gear ring on the cam 59. Secured to the cage is a cam follower 62 adapted to engage a cam 63 on the base 11. One pinion 64, meshes with the gear ring 58 and also with a stationary internal gear 58', while the other pinion 64' meshes with the gear ring on the cam 59 and also with an internal gear 59' on the cage 60. During operation, when the follower 62 is held against movement around the axis of the sleeve 17, the cam 59 will be rotated about that axis at the same rate of speed as the body 57 upon which it is mounted. When, however, the follower 62 is moved by the cam 63, the cam 59 will be given a supplemental movement around the same axis.

The movement of the cam 59 is used to operate the knives 6, which are here shown as three in number, each mounted on slides 65 in the guide body. Each of these slides has secured thereto one end of a lever 66 pivoted at 67 on the guide body, and having at its other end a roller 68 engaging the cam 59. Therefore, when the cam 59 is given its additional movement by the means described above, the levers 66 will be operated to bring the knives inwardly towards the tubing 1. The amount of this movement is sufficient to cause the knives, as they are moved by the motor around the axis of the tubing, to cut through the wall of the tubing by the time the carriage has reached the limit of its travel, which is determined by the position of the stop 42. The cam 63 is adjustably mounted on the base, and preferably is pivoted thereto, as shown in Fig. 1. When the follower 62 reaches the right hand end of the cam it passes around that end and returns on the other side thereof, the spring 75 moving the follower 62 and consequently the cam 59 and the knives 6 back to initial position. A spring 76 permits limited movement of the cam 63 in a clockwise direction during return movement of the cam follower 62, but when this follower passes around the left hand end of the cam 63, this spring draws the cam back against a stop 77.

On the face of the guide are mounted a plurality of rollers 69, here shown as three in number, each grooved to permit overlapping thereof with the adjacent knives, and each mounted in a slide 70 having sliding engagement with the guide by means of a bolt 71 having a head 72 received within a recess 73 in a block 74 secured to the face of the guide. This construction is best shown in Figs. 8 and 9.

The operation of the device will be apparent from the above description, but will be summarized as follows:—

The stop 7 is secured in position on the rock shaft such that the distance between the knives 6 and the stop will equal the length of tubes desired to be severed from the tubing. The carriage is at the position shown in Figs. 1 and 2. Tubing from the mill is fed through the open clamp and through the guide, it being remembered that the knives are now spaced away from the tubing. Movement of the tubing continues until it comes into contact with the stop 7, when this movement will be imparted to the carriage and parts carried thereby. As soon as the carriage starts to move the valve 30 is operated to cause the clamp jaws to engage the tubing, thereby almost instantaneously relieving the tubing between the stop and the knives of any strain.

Continued movement of the carriage causes removal of the stop 7 from in front of the tubing and also causes the knives to operate upon the tubing, the knives being operated by engagement of the follower 62 with the cam 63 and being moved bodily about the tubing by rotation of the sleeve 17. Movement of the tubing is then imparted to the carriage entirely through the relatively short section of tubing between the mill and the clamp. After the tubing is cut, the follower 62 will have reached the end of the cam 63, the stop 42 causing operation of the valve 30 to release the clamp, and then the spring 45 will cause return of the carriage to its initial position, this return causing movement of the knives and stop 7 to their initial positions also, by means hitherto described. The tubing is being continually fed forward by the mill, and the operation will be repeated.

While I have shown a selected form of my invention, I am aware that it may be embodied in other forms, and therefore I limit myself only by the appended claims.

I claim:—

1. A tubing cutter comprising a track, a carriage adapted to run on said track and carrying a clamp and a cutting knife, means to feed tubing through said clamp and into cooperative position with respect to the knife, means to stop movement of said tubing with respect to the carriage, means to cause operation of said clamp to secure the tubing to the carriage, means to render said stopping means inoperative, whereby continued movement of the tubing will be transmitted to the carriage through the clamps alone, and means operated by said continued movement of the carriage to move said knife about the axis of the tubing and towards the same to sever a length of tubing during said continued movement.

2. A tubing cutter comprising a track, a carriage adapted to run on said track and carrying a clamp and a cutting knife, means to feed tubing through said clamp and into cooperative position with respect to the knife, means to stop movement of said tubing with respect to the carriage, means to cause operation of said clamp to secure the tubing to the carriage, means to render said stopping means inoperative, whereby continued movement of the tubing will be transmitted to the carriage through the clamps alone, means operated by said continued movement of the carriage to move said knife about the axis of the tubing and towards the same to sever a length of tubing during said continued movement, means to release said clamp, and means to return the knife and carriage to their initial positions.

3. A tubing cutter comprising a carriage having a cutting knife thereon, means to guide the tubing into position to be cut by said knife, a stop on the carriage adapted to engage the end of the tubing, means to feed the tubing and thereby to impart movement to the carriage through engagement of the tubing with the stop, means actuated by initial movement of said carriage to secure the tubing to the carriage independently of the stop at a point adjacent the cut, and means actuated substantially immediately upon continued movement of the carriage to remove the stop from position in front of the tubing, whereby continued movement of the tubing will be transmitted to the carriage through said securing means alone.

4. A tubing cutter comprising a carriage having a cutting knife thereon, means to guide the tubing into position to be cut by said knife, a stop on the carriage adapted to engage the end of the tubing, means to feed the tubing and thereby to impart movement to the carriage through engagement of the tubing with the stop, means actuated by initial movement of said carriage to secure the tubing to the carriage independently of the stop at a point adjacent the cut, means actuated substantially immediately upon continued movement of the carriage to remove the stop from position in front of the tubing, whereby continued movement of the tubing will be transmitted to the carriage through said securing means alone, and means to operate said knife to sever a length of tubing during said continued movement.

5. A tubing cutter comprising a carriage having a cutting knife thereon, means to guide the tubing into position to be cut by said knife, a stop on the carriage adapted to engage the end of the tubing, means to feed the tubing and thereby to impart movement to the carriage through engagement of the tubing with the stop, means actuated by initial movement of said carriage to secure the tubing to the carriage independently of the stop, means actuated substantially immediately upon continued movement of the carriage to remove the stop from position in front of the tubing, whereby continued movement of the tubing will be transmitted to the carriage through said securing means alone, means to operate said knife to sever a length of tubing during said continued movement, means to release said securing means, and means to return the knife and carriage to their initial positions.

6. A tubing cutter comprising a base having a track thereon, a carriage adapted to be moved on said track and carrying a clamp and a cutting knife, means to feed tubing through said clamp and into cooperative position with respect to the knife, a rock shaft on the carriage and extending generally parallel to the length of said tubing, a stop on said shaft and adapted to engage the end of said tubing, cooperating means on the carriage and base adapted upon initial movement of the carriage to cause the clamp to engage the tubing, and to rock the shaft to remove the stop from its position in engagement with the tubing.

7. A tubing cutter comprising a base having a track thereon, a carriage adapted to be moved on said track and carrying a guide, means to feed tubing through said guide, means to transmit movement of the tubing to the carriage, means to rotate the guide about the tubing, one or more knives mounted on the guide and movable thereon towards and away from the tubing, a cam adapted to move said knives and rotatable with the guide, means adapted upon movement of the carriage to impart to said cam an additional rotation, and means operated by said additional rotation to move said knives towards the tubing to cut the same.

8. A tubing cutter comprising a base having a carriage movable thereon, a guide on said carriage past which tubing may pass, means to feed tubing through said guide, a plurality of knives spaced around said tubing and normally out of cutting position with respect thereto, a slide upon which each knife is supported and movable radially with respect to the tubing, means to secure the tubing to the carriage whereby movement of the tubing is imparted to the carriage, means to rotate said guide with its knives around said tubing, means actuated by movement of the carriage to give a supplementary rotation to said guide, and means actuated by said supplementary rotation to move said slides and knives radially with respect to the tubing.

9. A tubing cutter comprising a base having a carriage movable thereon, a guide on said carriage past which tubing may pass, means to feed tubing through said guide, a plurality of knives spaced around said tubing and normally out of cutting position with respect thereto, a slide upon which each knife is supported and movable radially with respect to the tubing, means to secure the tubing to the carriage whereby movement of the tubing is imparted to the carriage, means to rotate said guide with its knives around said tubing, means actuated by movement of the carriage to give a supplementary rotation to said guide, and means actuated by said supplementary rotation to move said slides and knives radially with respect to the tubing first towards the tubing into cutting position with respect thereto and subsequently away from said cutting position.

10. A tubing cutter comprising a base having a carriage movable thereon, a clamp on the carriage and adapted to engage moving tubing, whereby movement of the tubing will be imparted to the carriage, cooperating elements on said base and said carriage adapted to operate said clamp upon movement of the carriage, a knife rotatably mounted on the carriage and movable therewith, cooperating elements on the carriage and on the base and adapted to rotate said knife to bring it into operable position with respect to the tubing, and a spring resisting said rotation and adapted to return the knife to inoperable position after the cutting operation.

11. A tubing cutter comprising a base having a carriage movable thereon, means for feeding tubing past said carriage, means to secure tubing to the carriage whereby movement of the tubing is imparted to the carriage, a cam mounted on the base, a knife mounted on the carriage and movable therewith and normally out of cutting position with respect to the tubing, a cam follower engaging said cam and operatively connected to said knife to move it toward and away from the axis of said tubing by moving it about the axis thereof, and a spring holding said follower against said cam, said cam acting to move the knife toward cutting position against the action of the spring and the spring moving the knife back to inoperative position after the cutting operation.

12. A tubing cutter comprising a base having a carriage movable thereon, means for feeding tubing past said carriage, means to secure tubing to the carriage whereby movement of the tubing is imparted to the carriage, a cam mounted on the base, a knife mounted on the carriage and movable therewith and normally out of cutting position with respect to the tubing, a cam follower engaging said cam and operatively connected to said knife to move it toward and away from the axis of said tubing by moving it about the axis thereof, a spring holding said follower against said cam, said cam acting to move the knife toward cutting position against the action of the spring and the spring moving the knife back to inoperative position after the cutting operation, movement of the carriage causing the follower to pass the end of said cam, and means to move the carriage back in the opposite direction, said follower returning on the rear side of said cam.

13. A tubing cutter comprising a base having a carriage movable thereon, means for feeding tubing past said carriage, means to secure tubing to the carriage whereby movement of the tubing is imparted to the carriage, a cam mounted on the base and inclined to the direction of movement of the carriage, a rotatable member mounted on the carriage and through which the tubing passes, means to rotate said member, a knife mounted on said member and movable therewith and normally out of cutting position with respect to the tubing, a cam follower operatively connected to said member and engaging said cam whereby upon longitudinal movement of the carriage the cam will cause a supplementary rotation of the member, and means actuated by said supplementary rotation to move the knife into cutting position.

14. A tubing cutter comprising a base having a carriage movable thereon, means for feeding tubing past said carriage, means to secure tubing to the carriage whereby movement of the tubing is imparted to the carriage, a cam mounted on the base and inclined to the direction of movement of the carriage, a rotatable member mounted on the carriage and through which the tubing passes, means to rotate said member, a knife mounted on said member and movable therewith and normally out of cutting position with respect to the tubing, a cam follower operatively connected to said member and engaging said cam whereby upon longitudinal movement of the carriage the cam will cause a supplementary rotation of the member, means actuated by said supplementary rotation to move the knife into cutting position, and a spring holding said follower against said cam, normal operation of the carriage carrying said follower past the end of said cam whereby the spring will move the follower laterally to a position back of the cam.

15. A tubing cutter comprising a base having a carriage movable thereon, means for feeding tubing past said carriage, means to secure tubing to the carriage whereby movement of the tubing is imparted to the carriage, a cam mounted on the base and inclined to the direction of movement of the carriage, a rotatable member mounted on the carriage and through which the tubing passes, means to rotate said member, a knife mounted on said member and movable therewith and normally out of cutting position with respect to the tubing, a cam follower operatively connected to said member and engaging said cam whereby upon longitudinal movement of the carriage the cam will cause a supplementary rotation of the member, means actuated by said supplementary rotation to move the knife into cutting position, a spring holding said follower against said cam, normal operation of the carriage carrying said follower past the end of said cam whereby the spring will move the follower laterally to a position back of the cam, said cam being pivoted so that upon return movement of the carriage it may move laterally on the pivot, a spring resisting said movement of the cam, and a stop limiting movement of the cam under the influence of the spring.

16. A tubing cutter comprising a base having a carriage movable thereon, a knife on the carriage adapted to sever a length of tubing, a stop spaced from the knife and adapted to engage the end of the tubing to define the length to be cut, two jaws, one pivoted with respect to the other and mounted on the carriage, a toggle to operate the movable jaw on said pivot, and means actuated by movement of the carriage to operate said toggle to cause the movable jaw to engage the tubing.

17. A tubing cutter comprising a base having a carriage movable thereon, a knife on the carriage adapted to sever a length of tubing, a stop spaced from the knife and adapted to engage the end of the tubing to define the length to be cut, two jaws, one pivoted with respect to the other and mounted on the carriage, a toggle to operate the movable jaw on said pivot, means actuated by movement of the carriage to operate said toggle to cause the movable jaw to engage the tubing, and means actuated by continued movement of the carriage to release the jaw.

18. A tubing cutter comprising a base having a carriage movable thereon, a knife on the carriage adapted to sever a length of tubing, a stop spaced from the knife and adapted to engage the end of the tubing to define the length to be cut, two jaws, one pivoted with respect to the other and mounted on the carriage, a toggle to operate the movable jaw on said pivot, and fluid pressure means actuated by movement of the carriage to operate said toggle to cause the movable jaw to engage the tubing.

19. A tubing cutter comprising a base having a carriage movable thereon, a knife on the carriage adapted to sever a length of tubing, a stop spaced from the knife and adapted to engage the end of the tubing to define the length to be cut, two jaws, one pivoted with respect to the other and mounted on the carriage, a toggle to operate the movable jaw on said pivot, fluid pressure means actuated by movement of the carriage to operate said toggle to cause the movable jaw to engage the tubing, and means actuated by continued movement of the carriage to release the jaw.

20. A tubing cutter comprising a base having a carriage movable thereon, means to feed tubing past said carriage, a stop on the carriage adapted to limit movement of the tubing, means to clamp the tubing to the carriage, fluid pressure means to operate said clamp, a valve to control said fluid pressure means, means on the base and adapted upon movement of the carriage to operate said valve to close the clamp, and other means on the base adapted to operate the same valve to open the clamp upon continued movement of the carriage.

21. A tubing cutter comprising a base having a carriage movable thereon, a rock shaft mounted on said carriage and movable therewith, a stop secured to said rock shaft, means to feed tubing past the carriage into engagement with said stop, means on the carriage to sever a length of tubing, movement of the carriage being caused by engagement of the tubing end with said stop, means actuated by movement of the carriage to immediately clamp the tubing to the carriage, and means to immediately thereafter rock said shaft to remove the stop from in front of the tubing whereby continued movement of the carriage is caused by said clamping engagement.

22. A tubing cutter comprising a base having a carriage movable thereon, a rock shaft mounted on said carriage and movable therewith, a stop secured to said rock shaft, means to feed tubing past the carriage into engagement with said stop, means on the carriage to sever a length of tubing, movement of the carriage being caused by engagement of the tubing end with said stop, a track comprising a pair of rails mounted on the base, and an arm projecting from the rock shaft and having a follower confined between said rails, whereby rocking of the shaft in either direction is positively caused by engagement between said follower and one of said rails.

EDMUND J. von HENKE.

CERTIFICATE OF CORRECTION.

Patent No. 1,930,295.      October 10, 1933.

EDMUND J. von HENKE.

It is hereby certified that error appears in the printed specification of the above numbered patent requiring correction as follows: Page 3, line 99, claim 5, after "stop" and before the comma, insert the words at a point adjacent the cut; and that the said Letters Patent should be read with this correction therein that the same may conform to the record of the case in the Patent Office.

Signed and sealed this 21st day of November, A. D. 1933.

F. M. Hopkins
Acting Commissioner of Patents.

(Seal)

17. A tubing cutter comprising a base having a carriage movable thereon, a knife on the carriage adapted to sever a length of tubing, a stop spaced from the knife and adapted to engage the end of the tubing to define the length to be cut, two jaws, one pivoted with respect to the other and mounted on the carriage, a toggle to operate the movable jaw on said pivot, means actuated by movement of the carriage to operate said toggle to cause the movable jaw to engage the tubing, and means actuated by continued movement of the carriage to release the jaw.

18. A tubing cutter comprising a base having a carriage movable thereon, a knife on the carriage adapted to sever a length of tubing, a stop spaced from the knife and adapted to engage the end of the tubing to define the length to be cut, two jaws, one pivoted with respect to the other and mounted on the carriage, a toggle to operate the movable jaw on said pivot, and fluid pressure means actuated by movement of the carriage to operate said toggle to cause the movable jaw to engage the tubing.

19. A tubing cutter comprising a base having a carriage movable thereon, a knife on the carriage adapted to sever a length of tubing, a stop spaced from the knife and adapted to engage the end of the tubing to define the length to be cut, two jaws, one pivoted with respect to the other and mounted on the carriage, a toggle to operate the movable jaw on said pivot, fluid pressure means actuated by movement of the carriage to operate said toggle to cause the movable jaw to engage the tubing, and means actuated by continued movement of the carriage to release the jaw.

20. A tubing cutter comprising a base having a carriage movable thereon, means to feed tubing past said carriage, a stop on the carriage adapted to limit movement of the tubing, means to clamp the tubing to the carriage, fluid pressure means to operate said clamp, a valve to control said fluid pressure means, means on the base and adapted upon movement of the carriage to operate said valve to close the clamp, and other means on the base adapted to operate the same valve to open the clamp upon continued movement of the carriage.

21. A tubing cutter comprising a base having a carriage movable thereon, a rock shaft mounted on said carriage and movable therewith, a stop secured to said rock shaft, means to feed tubing past the carriage into engagement with said stop, means on the carriage to sever a length of tubing, movement of the carriage being caused by engagement of the tubing end with said stop, means actuated by movement of the carriage to immediately clamp the tubing to the carriage, and means to immediately thereafter rock said shaft to remove the stop from in front of the tubing whereby continued movement of the carriage is caused by said clamping engagement.

22. A tubing cutter comprising a base having a carriage movable thereon, a rock shaft mounted on said carriage and movable therewith, a stop secured to said rock shaft, means to feed tubing past the carriage into engagement with said stop, means on the carriage to sever a length of tubing, movement of the carriage being caused by engagement of the tubing end with said stop, a track comprising a pair of rails mounted on the base, and an arm projecting from the rock shaft and having a follower confined between said rails, whereby rocking of the shaft in either direction is positively caused by engagement between said follower and one of said rails.

EDMUND J. von HENKE.

---

CERTIFICATE OF CORRECTION.

Patent No. 1,930,295.      October 10, 1933.

EDMUND J. von HENKE.

It is hereby certified that error appears in the printed specification of the above numbered patent requiring correction as follows: Page 3, line 99, claim 5, after "stop" and before the comma, insert the words at a point adjacent the cut; and that the said Letters Patent should be read with this correction therein that the same may conform to the record of the case in the Patent Office.

Signed and sealed this 21st day of November, A. D. 1933.

F. M. Hopkins
Acting Commissioner of Patents.

(Seal)

CERTIFICATE OF CORRECTION.

Patent No. 1,930,295.   October 10, 1933.

EDMUND J. von HENKE.

It is hereby certified that error appears in the printed specification of the above numbered patent requiring correction as follows: Page 3, line 99, claim 5, after "stop" and before the comma, insert the words at a point adjacent the cut; and that the said Letters Patent should be read with this correction therein that the same may conform to the record of the case in the Patent Office.

Signed and sealed this 21st day of November, A. D. 1933.

F. M. Hopkins
Acting Commissioner of Patents.

(Seal)